(12) United States Patent
Torii

(10) Patent No.: US 8,331,349 B2
(45) Date of Patent: Dec. 11, 2012

(54) TRANSFER FUNCTION OF A TELEPHONE SYSTEM

(75) Inventor: Ryoji Torii, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 661 days.

(21) Appl. No.: 11/086,205

(22) Filed: Mar. 23, 2005

(65) Prior Publication Data

US 2006/0013378 A1   Jan. 19, 2006

(30) Foreign Application Priority Data

Jul. 13, 2004   (JP) .................................. 2004-205513

(51) Int. Cl.
*H04L 12/66* (2006.01)
*H04M 3/42* (2006.01)

(52) U.S. Cl. .................................. 370/352; 379/211.02
(58) Field of Classification Search .................. None
See application file for complete search history.

(56) References Cited

U.S. PATENT DOCUMENTS

| | | | | | |
|---|---|---|---|---|---|
| 4,475,009 | A * | 10/1984 | Rais et al. | ................. | 379/211.02 |
| 5,197,096 | A * | 3/1993 | Sakuma et al. | ........... | 379/207.13 |
| 6,026,155 | A * | 2/2000 | Takeuchi et al. | .......... | 379/211.02 |
| 6,041,114 | A * | 3/2000 | Chestnut | ................... | 379/211.02 |
| 6,072,865 | A * | 6/2000 | Haber et al. | ............. | 379/211.02 |
| 6,163,606 | A * | 12/2000 | Otto | .......................... | 379/211.02 |
| 6,301,473 | B1 * | 10/2001 | Nguyen et al. | ........... | 379/212.01 |
| 6,330,322 | B1 * | 12/2001 | Foladare et al. | ......... | 379/211.02 |
| 6,442,266 | B1 * | 8/2002 | Wu | ........................... | 379/211.02 |
| 6,480,593 | B1 * | 11/2002 | Munday et al. | .......... | 379/211.02 |
| 6,631,186 | B1 * | 10/2003 | Adams et al. | ............. | 379/211.02 |
| 7,149,297 | B2 * | 12/2006 | Idoni et al. | ................ | 379/211.02 |
| 7,203,299 | B1 * | 4/2007 | Cavness | .................... | 379/211.02 |
| 7,593,741 | B1 * | 9/2009 | Amin et al. | ............... | 379/211.02 |
| 2001/0040954 | A1 * | 11/2001 | Brachman et al. | ....... | 379/211.02 |
| 2002/0115432 | A1 * | 8/2002 | Roeder | .......................... | 455/415 |
| 2002/0118671 | A1 * | 8/2002 | Staples et al. | ................. | 370/352 |

(Continued)

FOREIGN PATENT DOCUMENTS

EP    1 492 318 A1   12/2004

(Continued)

OTHER PUBLICATIONS

Search and Examination Report issued by the British Patent Office on Sep. 26, 2007, for British Application No. GB0505842.5.

(Continued)

*Primary Examiner* — Timothy J Weidner
(74) *Attorney, Agent, or Firm* — Finnegan, Henderson, Farabow, Garrett & Dunner, L.L.P.

(57) ABSTRACT

A telephone system comprising a plurality of telephone terminals is provided. The telephone system includes a switching device connected to the telephone terminals via a communication network, and a server device connected to the communication network. The switching device includes a transfer section for transferring a call to a telephone terminal in which a transfer function is set therein to a telephone terminal at a transfer destination. Also, the server device includes a monitor section for monitoring a log-in/log-out state of a user for each of the plurality of telephone terminals. The server also includes a releasing section for releasing the setting of the transfer function on the basis of the result of the monitoring when an operation to the telephone terminal with the transfer function set therein by a log-in user satisfies a defined condition.

16 Claims, 14 Drawing Sheets

Database 43

| Terminal ID | Telephone number | Log-in time | Log-out time | Communication termination time | Transfer setting | Transfer set time | User ID | IP address |
|---|---|---|---|---|---|---|---|---|
| 3A | 1234 | 9:50 | | | Transfer to 2345 | 9:50 | U1 | U1@192.168.100.1 |
| 3B | 2345 | | | | | | U0 | U0@192.168.200.5 |
| | | 10:30 | 11:10 | 10:40 | Transferred from 1234 | 9:50 | U1 | U1@192.168.200.1 |
| 3N | 4567 | | | | | | Un | Un@192.168.100.3 |

U.S. PATENT DOCUMENTS

| | | | |
|---|---|---|---|
| 2003/0035529 A1* | 2/2003 | Baker | 379/211.02 |
| 2003/0228011 A1* | 12/2003 | Gibson | 379/211.02 |
| 2005/0058269 A1* | 3/2005 | Watts et al. | 379/211.02 |
| 2005/0141691 A1* | 6/2005 | Wengrovitz | 379/211.02 |
| 2005/0195958 A1* | 9/2005 | Schwab et al. | 379/211.02 |
| 2009/0059818 A1* | 3/2009 | Pickett | 370/259 |

FOREIGN PATENT DOCUMENTS

| | | |
|---|---|---|
| EP | 1 517 525 A1 | 3/2005 |
| GB | 2 122 846 | 1/1984 |
| JP | 61-227456 | 10/1986 |
| JP | 62-042657 | 2/1987 |
| JP | 5-207159 | 8/1993 |
| JP | 10-327250 | 12/1998 |
| JP | 2001-339478 | 12/2001 |
| JP | 2002-64640 | 2/2002 |
| JP | 2002-152224 | 5/2002 |
| JP | 2003-324524 | 11/2003 |
| WO | WO 01/01664 A1 | 1/2001 |

OTHER PUBLICATIONS

Combined Search and Examination Report issued by the British Patent Office for Appl. No. GB0505842.5, dated Aug. 1, 2005.

Office Action (Notification of Reasons for Rejection) from Japanese Patent Office in corresponding Japanese Application No. 2004-205513, mailed on Nov. 9, 2007.

* cited by examiner

Table 26

| Terminal ID | Telephone number | User ID | IP address |
|---|---|---|---|
| 3A | 1234 | U1 | U1@192.168.100.1 |
|  |  |  |  |
| 3B | 2345 | U0 | U0@192.168.200.5 |
|  |  |  |  |
| 3N | 4567 | Un | Un@192.168.100.3 |

Table 26

| Terminal ID | Telephone number | User ID | IP address |
|---|---|---|---|
| 3A | 1234 | U1 | U1@192.168.100.1 |
|  |  |  |  |
| 3B | 2345 | U0 | U0@192.168.200.5 |
|  |  | U1 | U1@192.168.200.5 |
| 3N | 4567 | Un | Un@192.168.100.3 |

FIG. 5A

| Terminal ID | Telephone number | Log-in time | Log-out time | Communication termination time | Transfer setting | Transfer set time | User ID | IP address |
|---|---|---|---|---|---|---|---|---|
| 3A | 1234 | 9:00 | | | | | U1 | U1@192.168.100.1 |
| 3B | 2345 | | | | | | U0 | U0@192.168.200.5 |
| 3N | 4567 | | | | | | Un | Un@192.168.100.3 |

FIG. 5B

| Terminal ID | Telephone number | Log-in time | Log-out time | Communication termination time | Transfer setting | Transfer set time | User ID | IP address |
|---|---|---|---|---|---|---|---|---|
| 3A | 1234 | 9:50 | | | Transfer to 2345 | 9:50 | U1 | U1@192.168.100.1 |
| 3B | 2345 | 9:50 | | | Transferred from 1234 | 9:50 | U0 | U0@192.168.200.5 |
|  |  |  |  |  |  |  | U1 | U1@192.168.200.1 |
| 3N | 4567 | | | | | | Un | Un@192.168.100.3 |

FIG. 5C

| Terminal ID | Telephone number | Log-in time | Log-out time | Communication termination time | Transfer setting | Transfer set time | User ID | IP address |
|---|---|---|---|---|---|---|---|---|
| 3A | 1234 | 9:50 | | | Transfer to 2345 | 9:50 | U1 | U1@192.168.100.1 |
| 3B | 2345 | 10:30 | 11:10 | 10:40 | Transferred from 1234 | 9:50 | U0 | U0@192.168.200.5 |
|  |  |  |  |  |  |  | U1 | U1@192.168.200.1 |
| 3N | 4567 | | | | | | Un | Un@192.168.100.3 |

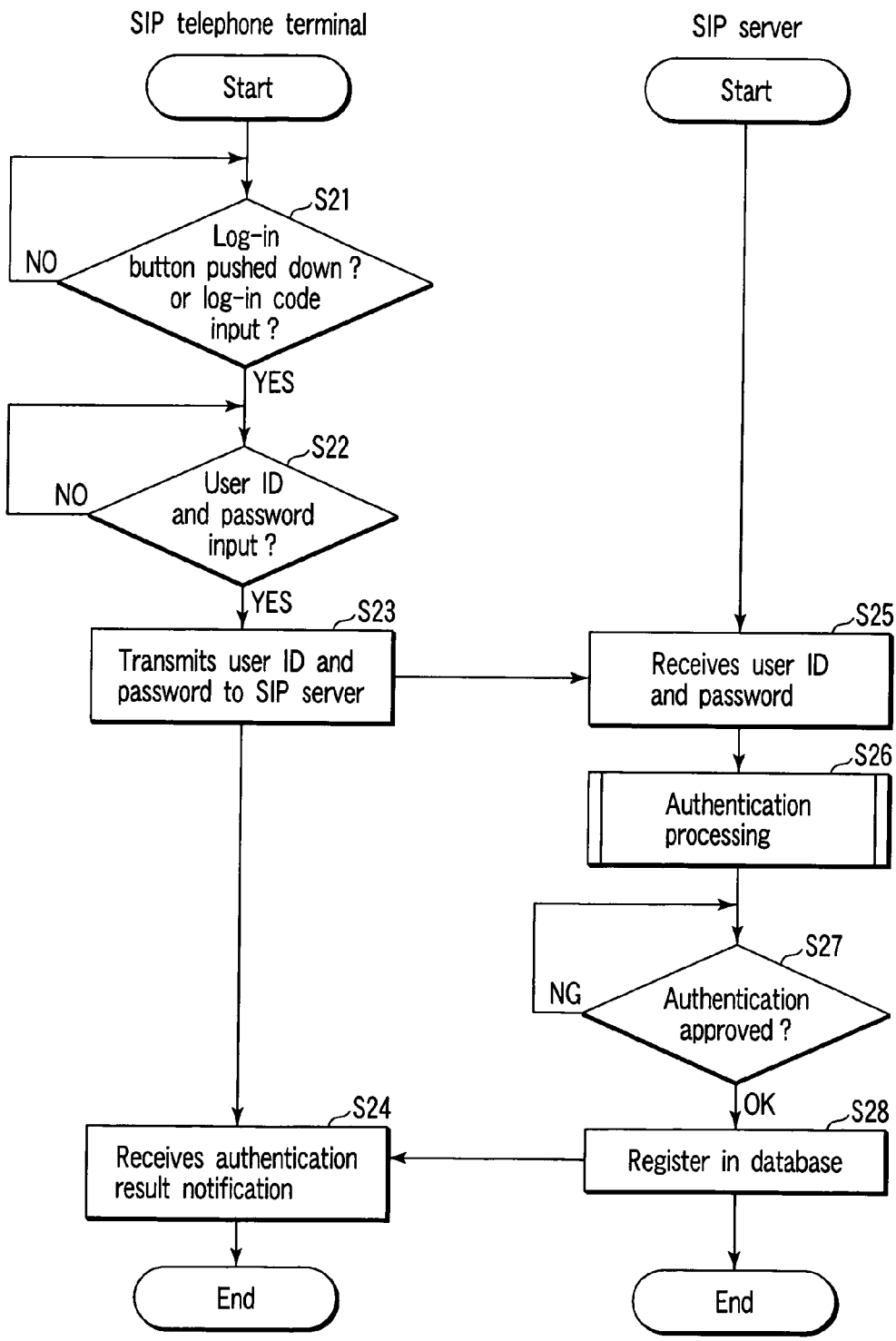
F I G. 11

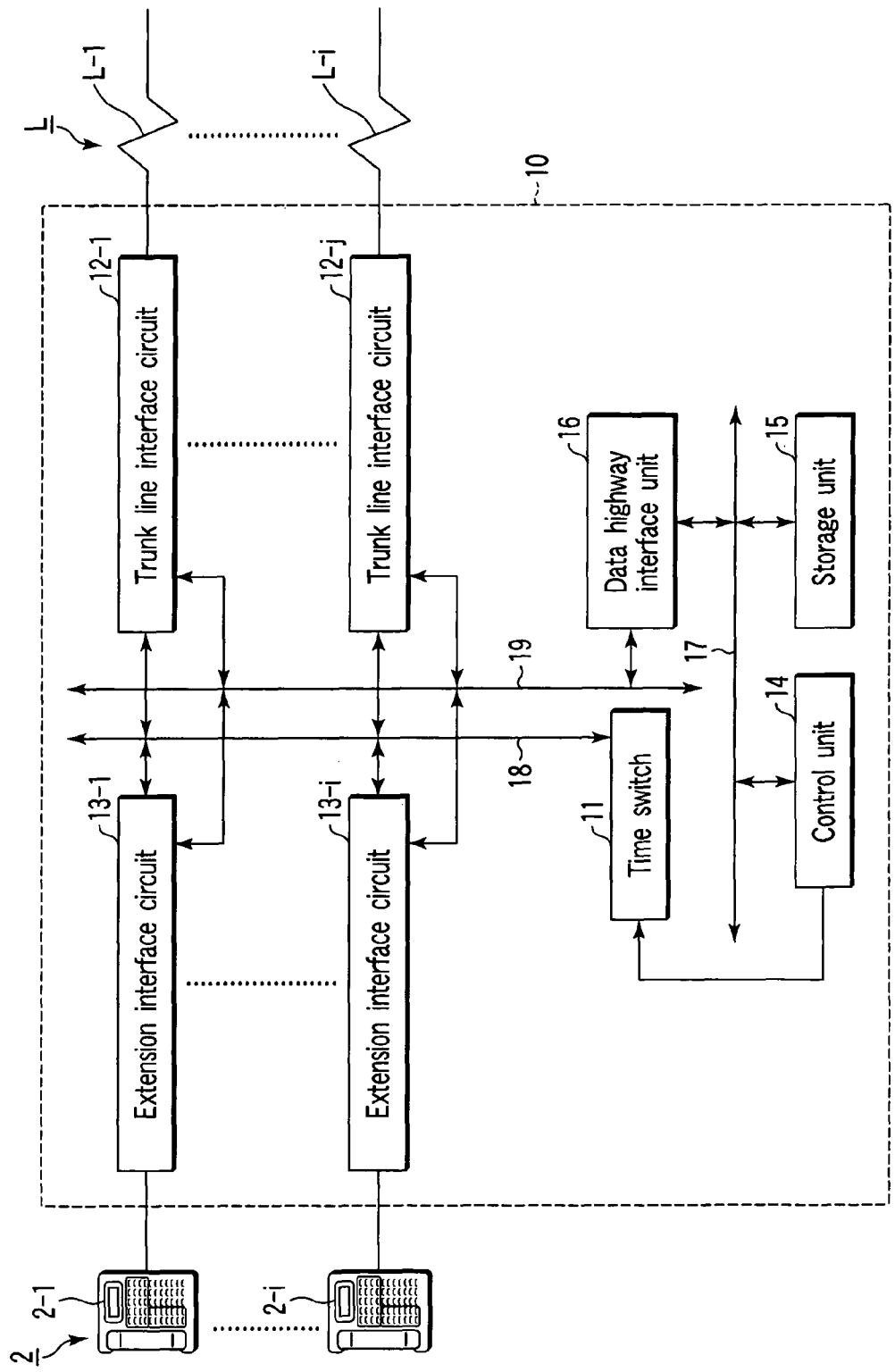
F I G. 14

TRANSFER FUNCTION OF A TELEPHONE SYSTEM

CROSS-REFERENCE TO RELATED APPLICATIONS

This application is based upon and claims the benefit of priority from prior Japanese Patent Application No. 2004-205513, filed Jul. 13, 2004, the entire contents of which are incorporated herein by reference.

BACKGROUND OF THE INVENTION

1. Field of the Invention

The present invention relates to a telephone system quipped with a transfer function.

2. Description of the Related Art

In recent years, a telephone service in a company and a business office has become widely diversified by using an Internet protocol (IP) telephone. Particularly, in a session initiated protocol (SIP) telephone system, a user itself can set a variety of functions to a telephone terminal (for example, refer to, Jpn. Pat. Appln. KOKAI Publication No. 2002-152224).

The SIP telephone system has necessary functions and unnecessary functions in accordance with a user's preference. In the SIP telephone system, the user can use favorite telephone functions by individually combining them for each user. This is because an application server for managing the telephone functions manages the functions by associating a user ID with identification information of a telephone terminal. The user can invoke and use personal functions from any telephone terminal by using this management function. In contrast, a plurality of users can respectively use a single telephone terminal as a personally set telephone terminal.

By the way, a transfer function is known in a system of this kind. The transfer function transfers an incoming call to a previously set other place (conference room, etc.) when a user is not present at an original place (office, etc.). A telephone terminal at a transfer destination is set from a telephone terminal at a desk of the user before the user moves away from the desk. However, if the user forgets to release the transfer function after coming back to the desk, the telephone terminal at the desk is left in a state not to receive an incoming call. As just described, there is a problem that in the transfer function capable of being set the transfer destination from the telephone terminal by the user, the original telephone terminal is left in the state not to receive the incoming call if the user forgets to release the transfer function.

BRIEF SUMMARY OF THE INVENTION

According to an aspect of the present invention, there is provided a telephone system comprising a plurality of telephone terminals, a switching device connected to the telephone terminals via a communication network, and a server device connected to the communication network, wherein the switching device comprises a transfer section for transferring a call to a telephone terminal in which a transfer function is set therein to a telephone terminal at a transfer destination, and the server device comprises a monitor section for monitoring a log-in/log-out state of a user for each of the plurality of telephone terminals and a releasing section for releasing the setting of the transfer function on the basis of the result of the monitoring when an operation to the telephone terminal with the transfer function set therein by a log-in user satisfies a defined condition.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5A to 5C are illustrations respectively showing contents of the stored data in the database section 43 in FIG. 4.

FIG. 11 is a flowchart showing log-in procedures in the SIP telephone terminals 3A-3N in the third embodiment.

FIG. 14 is a block diagram showing the PBX apparatus 10 in FIG. 13.

DETAILED DESCRIPTION OF THE INVENTION

Hereinafter, embodiments of the present invention will be explained by referring to drawings.

(First Embodiment)

Figure 1:
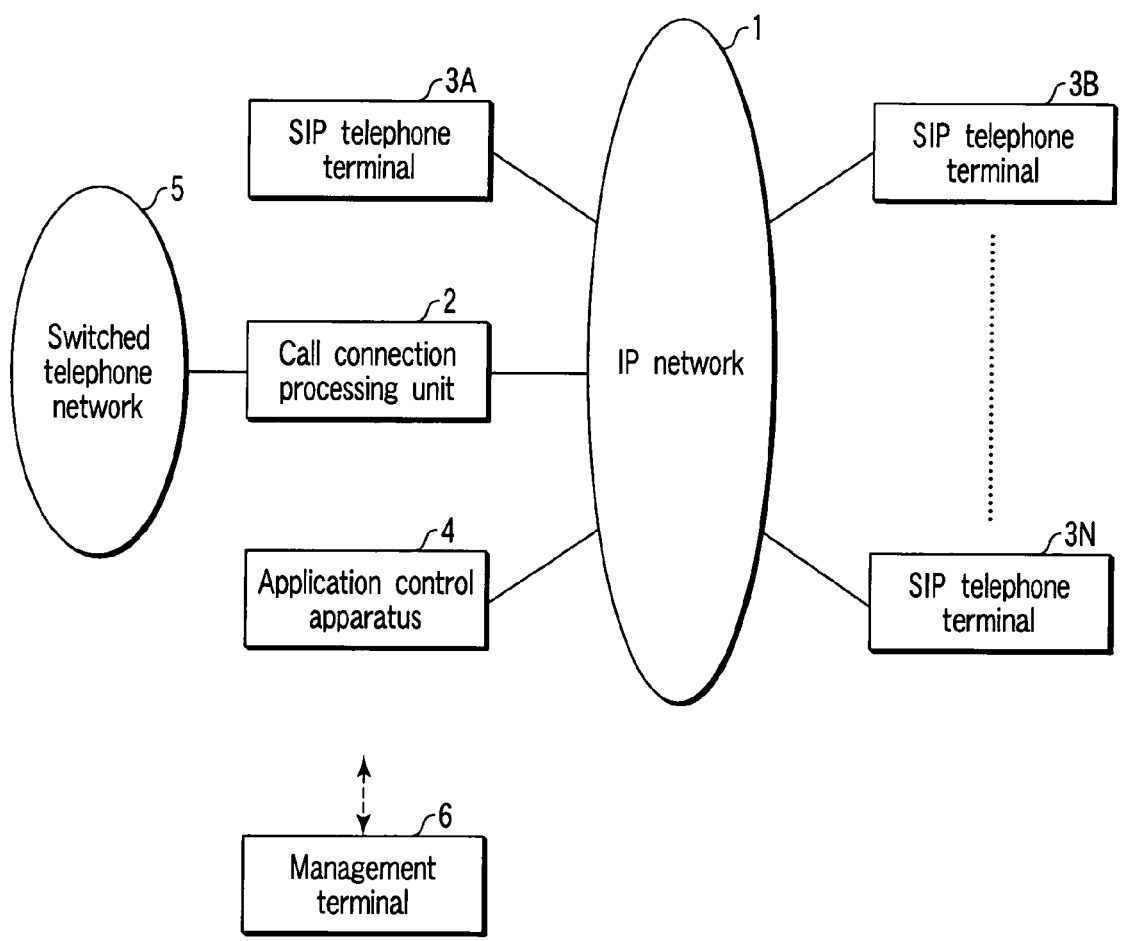
FIG. 1 is a system diagram showing a first embodiment of an SIP telephone system regarding the invention.

FIG. 1 is a system diagram showing a first embodiment of an SIP telephone system regarding the invention. The SIP telephone system shown in FIG. 1 comprises a call connection processing unit 2, SIP telephone terminals 3A-3N, an application control apparatus 4, a switched telephone network 5, and a management terminal 6. Each of them is respectively connected to an IP network 1 thorough a router (not shown). The IP network 1 is a network, for example, the Internet or an intra-net, to transmit an IP packet.

The processing unit 2 performs mutual call connection processing among the SIP telephone terminals 3A-3N, log-in management, etc. in accordance with SIP procedures via the IP network 1. The processing unit 2 is connected to the switched telephone network 5 sometimes. In this case, the processing unit 2 sometimes called an SIP server or an IP-PBX. In this case, the SIP telephone terminals 3A-3N can communicate with telephone sets belonging to the switched telephone network 5.

The processing unit 2 conducts connection control of calls from the switched telephone network 5 or mutual calls among the SIP terminals 3A-3N by using service information transmitted and received to and from the control apparatus 4. For example, it is assumed that a transfer function to set the SIP terminal 3B as a transfer destination in the SIP terminal 3A. In this case, the processing unit 2 performs call connection processing to transfer the calls to the SIP terminal 3A to the SIP terminal 3B.

The SIP telephone terminals 3A-3N (hereinafter, items common to the SIP telephone terminals 3A-3N will be explained by integrally referring to as an SIP telephone terminal 3) comprises a voice packet processor and a call controller. The packet processor converts a voice signal into an IP packet. The call controller performs call connection processing such as dial information processing and ringer tone control. Next, call connection processing with telephone service of the SIP terminal 3 will be explained.

Each SIP terminal 3 has unique identification information. Each SIP terminal 3 notifies operation setting information for each SIP terminal 3 to the processing unit 2 and the control apparatus 4 via the IP network 1. The setting information includes telephone numbers, IP addresses, user IDs of telephone terminals, setting information about a variety of telephone services (transfer function), etc. With logging on to the IP network 1, the SIP terminals 3 become possible to communicate with telephone sets belong to other SIP terminals 3 or the switched telephone network 5.

The control apparatus 4 monitors (receives) the packets transmitted from the SIP terminals 3 via the IP network 1. The control apparatus 4 reads setting contents of telephone services (holding function, transfer function, etc.) set into each SIP terminal 3 from the packets. The read contents are stored into an internal database of the control apparatus 4. If necessary, the control apparatus 4 transmits and receives information for making call connection on the basis of the setting contents to and from the processing unit 2 via the IP network 1.

The control apparatus 4 also monitors packets related to call connection transmitted and received between the SIP terminals 3 and the processing unit 2 via the IP network 1. Information acquired by the monitoring is stored into the internal database of the control apparatus 4. Data of this kind includes log-in time, call connection time, etc. for each SIP terminal 3. The control apparatus 4 shown in FIG. 1 is connected to the IP network 1 as an independent apparatus. In addition to this, the control apparatus 4 may be provided inside the processing unit 2. In this case, the control apparatus 4 transmits and receives data to and from other internal component such as the processing unit 2 via an internal bus, etc. The management terminal 6 is connected to the processing unit 2, the control apparatus 4 and the SIP terminals 3A-3N directly or via the IP network 1. The management terminal 6 is provided for inputting data into a system or monitoring the data, wherein the data is necessary to operate at least one of the processing unit 2, the control apparatus 4 and SIP terminals 3A-3N.

Figure 2:
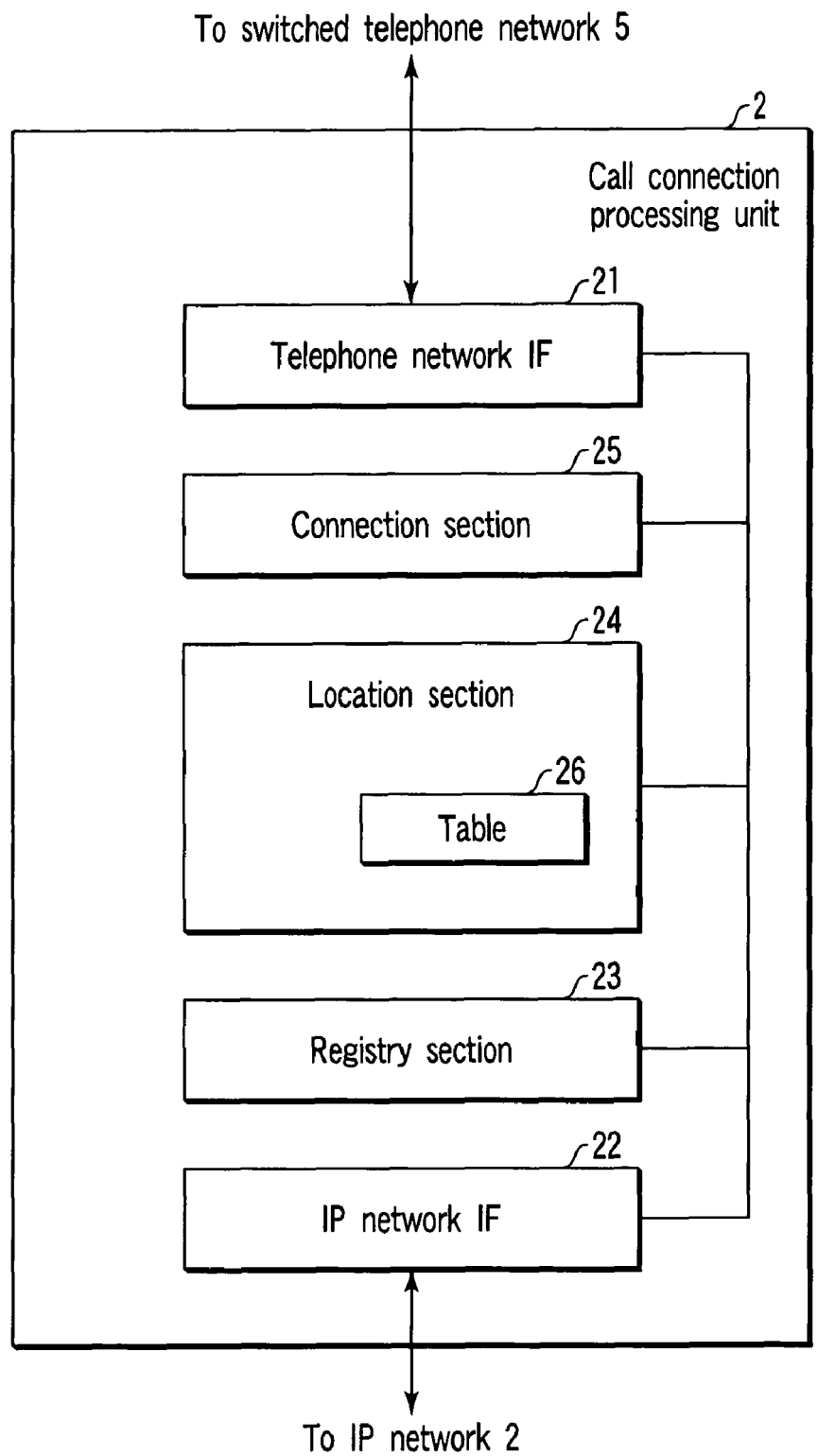
FIG. 2 is a functional block diagram of the processing unit 2 in FIG. 1.

FIG. 2 is a functional block diagram of the processing unit 2 in FIG. 1. In FIG. 2, the processing unit 2 equips a telephone network interface (IF) 21, an IP network IF 22, a registry section 23, a location section 24, a connection section 25 connected via an internal bus with one another, and a table 26.

The registry section 23 is connected to the IP network 1 via the IF 22 and receives addresses notification from each SIP terminal 3A-3N. The received addresses are registered in the location section 24. The registered addresses are associated with terminal IDs, telephone numbers, IP addresses, user IDs, etc. of the respective SIP terminals 3. The location section 24 writes the information about the registered addresses into a list in the table 26. The table 26 is provided in a specified area in an internal memory of the location section 24.

Figures 3A, 3B, 4:
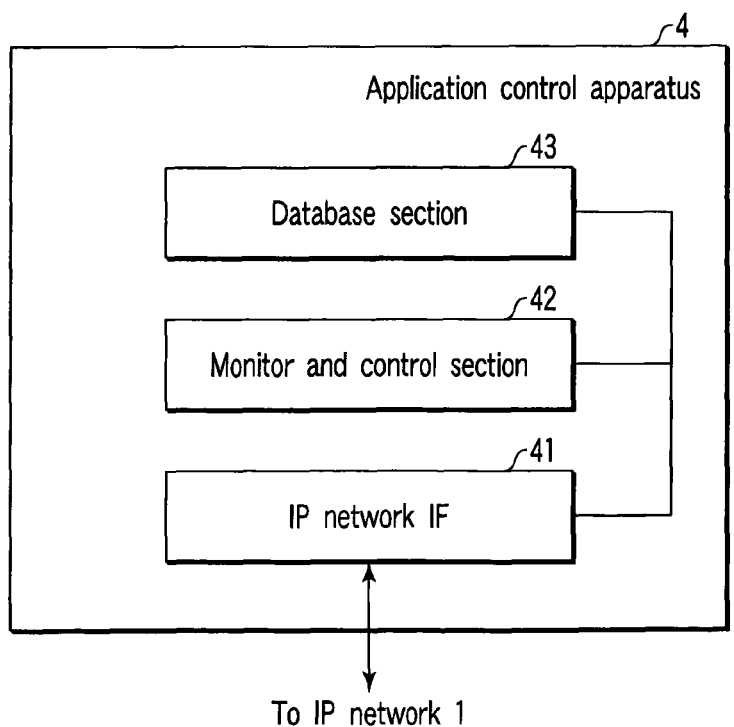
FIGS. 3A and 3B are illustrations showing an example of the list stored in the table 26.
FIG. 4 is a functional block diagram of the control apparatus 4 in FIG. 1.

FIGS. 3A and 3B are illustrations showing an example of the list stored in the table 26. In the table 26, items such as a terminal ID, a telephone number, a user ID and an IP address assigned to the SIP terminal 3A are provided. In FIG. 3, information such as "3A", "1234", "U1" and "UI@192.168.100.1" is recorded in each item, respectively. FIG. 3A shows the content of the table 26 when a telephone service is not set yet therein. FIG. 3B shows the content of the table 26 when a transfer function is set therein.

In FIG. 2, the connection section 25 receives an incoming call signal from the IP network 1 via the IF 22. The incoming call signal is a call connection request transmitted through a control packet and a signal including destination information specified by the telephone number or the user ID, etc. The connection section 25 with the incoming call signal received therein reads out service information in the database of the control apparatus 4 and confirms a telephone number of an origin of calling, whether or not the transfer function for a destination of an incoming call has been already set, etc. In the case that the transfer function has been already set for the telephone number of the destination of the incoming call, the connection section 25 reads out the telephone number of the transfer destination and the IP address of the SIP terminal 3 corresponding to the telephone number. Then, the connection section 25 transmits incoming call information of the packet already set to a destination address of the transfer destination to the IP network 1 via the IF 22. The list of addresses stored in the table 26 of the location section 24 is utilized as reference information for a connection destination of a call.

FIG. 4 is a functional block diagram of the control apparatus 4 in FIG. 1. The control apparatus 4 comprises an IP network IF 41, a monitor and control section 42 and a database section 43. The control section 42 monitors data (data regarding a transfer function, log-in information, etc.) from the SIP terminals 3 via the IP network 1. The monitored data is written and stored into the database section 43.

FIGS. 5A to 5C are illustrations respectively showing contents of the stored data in the database section 43 in FIG. 4. FIG. 5A shows the stored data on a state in which the telephone function has not been set yet. In FIG. 5A, the database 43 stores terminal IDs "3A" . . . , telephone numbers "1234" . . . , and user IDs "U1" . . . , corresponding thereto, respectively.

FIG. 5B shows stored data on a state in which the transfer function has already been set. Hereinafter, a function for unconditionally transferring an incoming call to a telephone terminal of a preset destination of an incoming call will be explained as a transfer function. Such a function is generally referred to as absence transfer.

Items such as "log-in time", "log-out time", "communication termination time", "transfer setting" are stored into the database section 43 for each SIP terminal 3A-3N. Particularly, detailed items such as presence/absence of setting, a kind, setting time are prepared for the items of the "transfer setting". The monitor and control section 42 monitors each SIP terminal 3A-3N, based on the contents in the database section 43. After termination of telephone communication, or when a prescribed time from the final "log-out time" has elapsed, the control section 42 deletes the data regarding the transfer setting of the relevant SIP terminal 3 from the database 43. Thereby, the setting of the transfer function is released.

Figure 6:
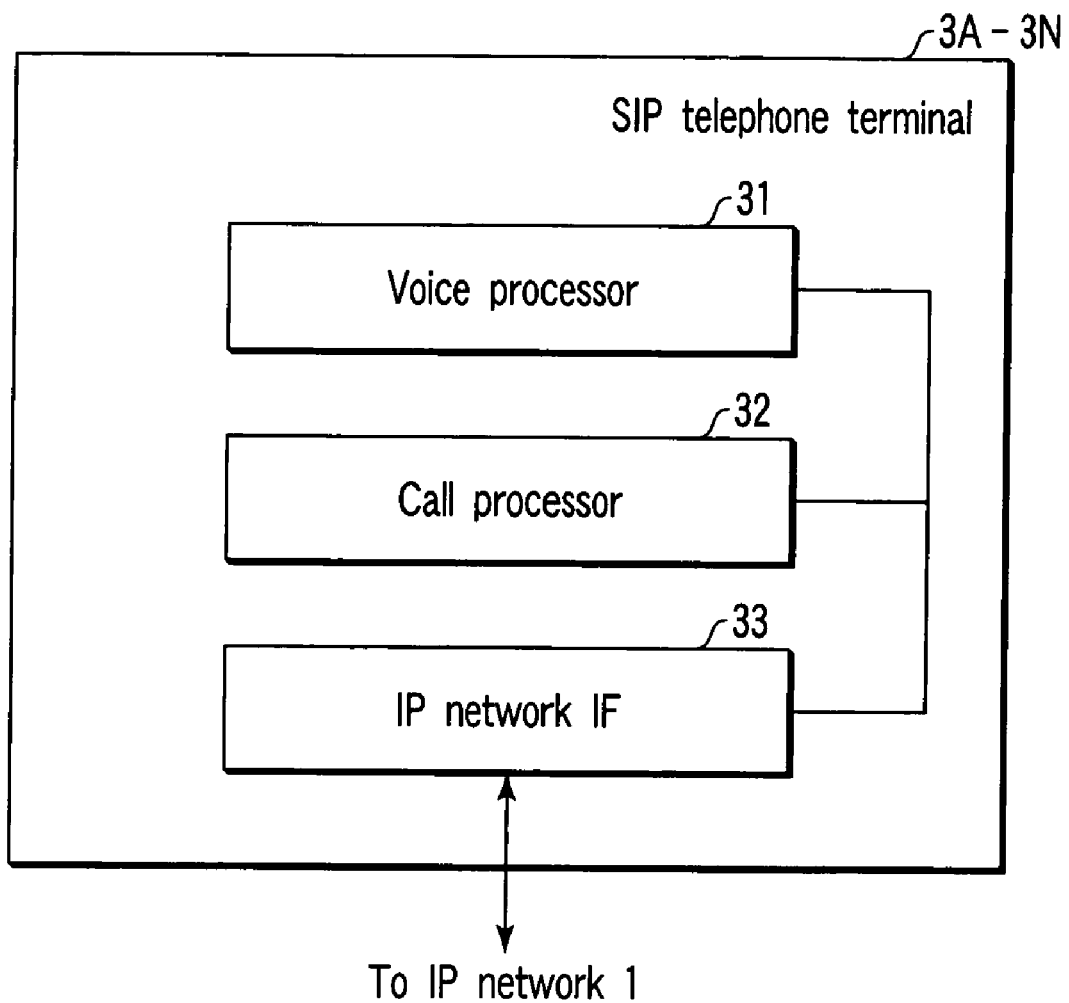
FIG. 6 is a functional block diagram showing each of the SIP terminals 3.

FIG. 6 is a functional block diagram showing each of the SIP terminals 3. Each SIP terminal 3 equips the voice processor 31, the call processor 32 and an IP network IF section 33.

The voice processor 31 mainly performs voice packet processing. The call processor 32 mainly performs call connection processing. The IP network IF section 33 performs interface processing for transmitting and receiving IP packets among the SIP terminals 3 and the IP network 1. Moreover, the voice processor 31 equips a handset, a code processing circuit, etc. (not shown). The call processor 32 equips key buttons, a ringer tone processing circuit, etc. (not shown).

The call processor 32 mutually transmits and receives data packets regarding the call connection to and from the IP network IF 33. The packets include identification information, telephone numbers, IP addresses, user IDs, etc. of the SIP terminals 3. The key buttons are used to input the telephone number of the destination of calling, input the user IDs and set the telephone function. Hereinafter, the description about operations of internal configuration of the SIP terminal 3 will be eliminated as long as it will be required.

Figure 7:
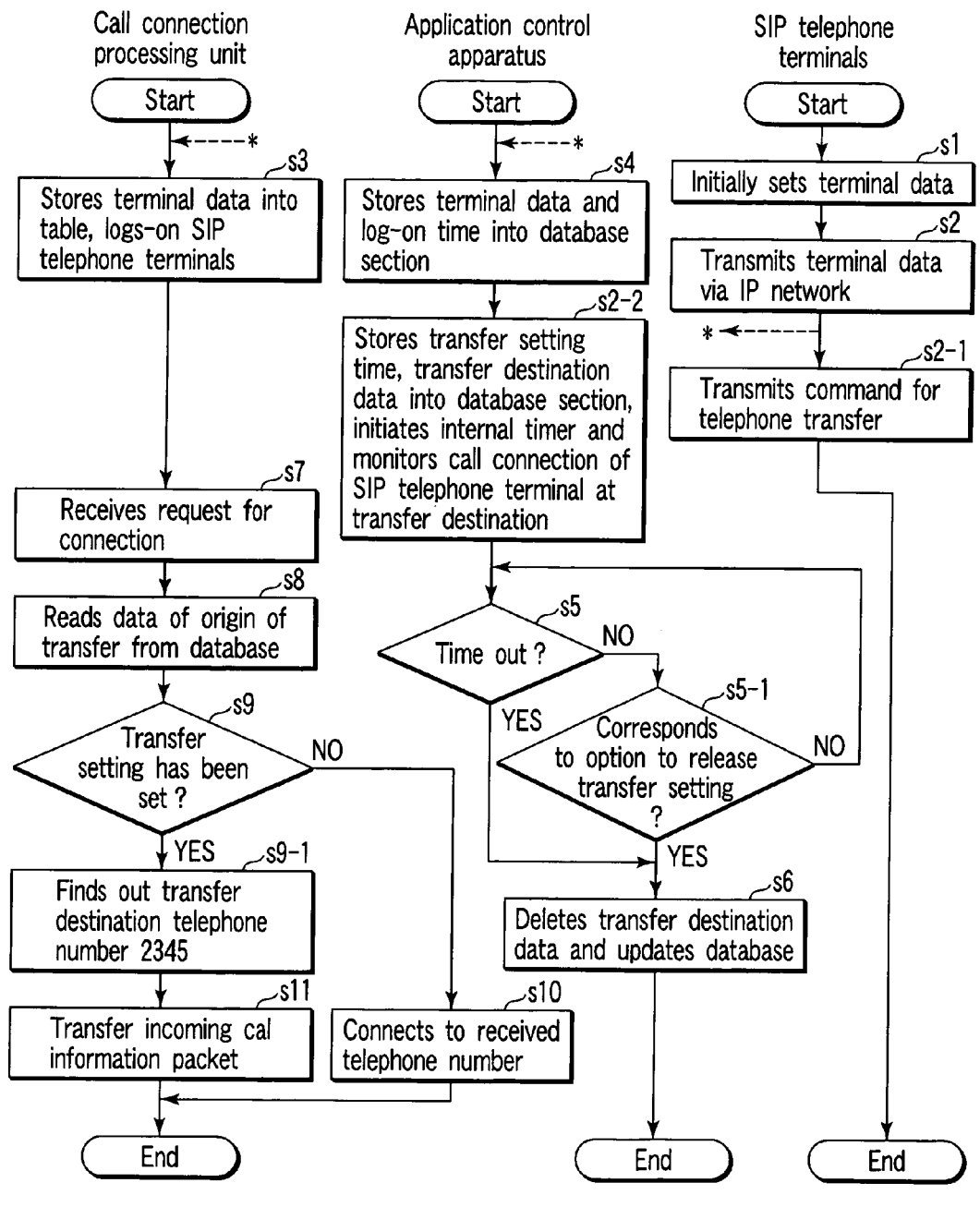
FIG. 7 is a flow chart showing processing procedures in an SIP telephone system for conducting the transfer function in the first embodiment.

FIG. 7 is a flow chart showing processing procedures in an SIP telephone system for conducting the transfer function in the first embodiment. In FIG. 7, terminal IDs, telephone numbers, IP addresses and user IDs are initially set into each SIP terminal 3 as terminal data when it is incorporated into the SIP telephone system. For example, "3A", "3B" are assigned as identification information (user ID) to the SIP terminals 3A, 3B. "1234", "2345" are assigned as the telephone numbers. As an example, "U1", "U1@192.168.200.5" is assigned. If a user is not specified, for example, "U0", "U0@192.168.200.5" is initially set (step s1).

The initial setting data is input into the SIP terminals 3 by prescribed operation procedures using the key buttons. Or, the initial setting data is input into the SIP terminals 3 by down loading the initial setting data from the management terminal 6 for the SIP terminals 3. The initial setting data is written and stored into the internal memories, etc. of the SIP terminals 3, respectively.

Next, taking the SIP terminal 3A as an example, procedures to resister and log-in the SIP terminals 3 in the SIP telephone system will be explained. When the handset becomes off-hook state, the SIP terminal 3A is connected to the processing unit 2 via the IP network 1. Then, the initially set terminal data is automatically read out from the internal memory by the prescribed procedures. The terminal data is transmitted to the processing unit 2 via the IP network 1 (step s2).

Only when setting initially, it is not necessary to automatically transmit the terminal data after off-hook. For example, the terminal data may be transmitted to the processing unit 2 after completion of inputting of the terminal data by the key buttons. The terminal data includes authentication information of an SIP telephone terminal, authentication information of a user, etc. and tentative log-in processing is conducted sometimes.

The registry section 23 of the processing unit 2 receives the packet from the IP network 1 and registers the identification information "3A", the telephone number "1234", the user ID "U1" and the IP address "U1@192.168.100.1" into the location section 24. As shown FIG. 3, the location section 24 writes input each terminal data into the table 26. Thereby, the log-in processing of the SIP terminal 3A is completed (step s3). The registry section 23 initiates an internal timer after completion of the log-in processing of the SIP terminal 3A. If the SIP terminal 3A does not make a call, or does not conduct re-log-in processing (Off-hook, etc.) even a prescribed time has elapsed after the initiation of the timer, the SIP terminal 3 is forced to be logged off.

The packet transmitted from the SIP terminal 3A to the processing unit 2 at the time of log-in is also monitored by the control apparatus 4. The monitored terminal data and the data of the log-in time, etc. is written and stored into the database 43 (step s4). For the SIP terminals 3B-3N, registration, storage and log-in processing are conducted similarly. After completion of this log-in processing, the call connection processing on the SIP telephone system is conducted by inputting the telephone numbers or commands for transfer, etc.

The user "U1" uses the SIP terminal 3A with its own user ID "U1" registered therein in its own room. It is assumed that, for example, the user "U1" moves to a conference room during the morning from 10:00 AM. At this time, the user "U1" inputs the command to transfer a call incoming to the SIP terminal 3A to the SIP terminal 3B in the conference room previously (at 9:50 AM, etc.)

The SIP terminal 3A becomes an off-hook state when the user "U1" picks up the handset, and logs on again in the SIP telephone system. Subsequently, the user "U1" inputs "*" meaning a command of a transfer function and a telephone number "2345" of the SIP terminal 3B being the transfer destination by using the key buttons. Then, the packet including the command "*2345" is transmitted from the SIP terminal 3A to the control apparatus 4 and processing unit 2 via the IP network 1 (step s2-1).

When receiving the packet, the control apparatus 4 acquires the telephone number "2345" of the transfer destination and the log-in time (also treated as a transfer set time). Next, the control apparatus 4 stores the acquired data into the database section 43, initiates the internal timer and starts monitoring the call connection of the SIP terminal 3A through the processing unit 2 (step s2-2). FIG. 5B shows stored data in the database 43 regarding the SIP terminal 3A with the transfer destination additionally registered therein. The database section 43 stores a telephone number "2345", log-in time "9:50 AM" at which the transfer function is set, etc.

After completion of this setting, it is assumed that an incoming call to the SIP terminal A, that is, a connection request for the telephone number "1234" is received by the processing unit 2 (step s7). Then, the request is received by the telephone network IF 21 of the processing unit 2 via the switched telephone network 5 and output to the connection section 25 through the internal bus.

The connection section 25 reads the telephone number "1234" of the connection destination from the incoming call signal and collates the telephone number with the connection section 24. Furthermore, the connection section 25 collates the database section 43 of the control apparatus 4 and reads out the data of the origin of the transfer destination such as the identification information "3A" and the user ID "U1" of the SIP terminal 3A with the telephone number "1234" (step s8).

When the connection section 25 reads out, from the database section 43, the fact that "transfer" has already set at the SIP terminal 3A (Yes, in step s9), the connection section 25 finds out the telephone number "2345" of the transfer destination (step s9-1). The connection section 25 finds out the IP address "U1@192.168.200.5" of the SIP terminal 3B corresponding to the telephone number "2345" from the table 26 of the location section 24. Then, the connection section 25 generates an incoming call packet having this IP address as a destination and transfers it to the SIP terminal 3B (step s11). The SIP terminal B which has received the incoming cal packet rings a ringer tone by the call processor 32. When the user "U1" picks up the handset with response to the receiving of the ringer tone, telephone communication is started.

FIG. 5C shows data stored in a database when an incoming call reaches a telephone terminal at a transfer destination. In FIG. 5C, the time "10:30" when a handset of the telephone terminal at the transfer destination has picked up is recorded at "log-in time" as a re-log-in time. When the communication is terminated, information about the termination of the communication (on-hook) of the SIP terminal 3B is notified to the processing unit 2 from the call processor 32. Then, the fact of the termination of the communication is notified to the control apparatus 4 from the processing unit 2. The control apparatus 4 monitors the call connection of the SIP terminals 3 and stores "10:40" of "communication termination time" of the SIP terminal 3B into the database section 43. In the case that "transfer" has not been set at the SIP terminal 3A (NO, in step s9), incoming call information is transmitted as it is to the SIP terminal 3A with the telephone number "1234" (step s10).

When coming back to the desk after the completion of the conference, the user "U1" picks up the handset of the SIP terminal (telephone set) 3A and inputs a command (for example, "*00") to release the setting of the transfer function by using the key buttons. Then, a command to notify transfer release is transmitted from the SIP terminal 3A to the control apparatus 4. The control apparatus 4 which has received the command deletes the data to set the transfer function from the database section 43. Thereby, the transfer setting is released.

However, there is the case that the user "U1" goes out without releasing the setting of the transfer function after the completion of the conference, or the user "U1" forgets to release the setting of the transfer function even it comes back to its own desk. Then, since the calling called up to the telephone number "1234" is transferred consistently to the SIP terminal 3B at the transfer destination, the calling can not be received at the SIP terminal 3A.

Consequently, in this embodiment, the control apparatus 4 monitors the database section 43 and monitors the call connection state and the log-in state after setting the transfer function. Then, the control apparatus 4 compulsorily releases the setting of the transfer function after an elapse of a prescribed time from the communication termination time or log-out time.

That is, the control apparatus 4 monitors the call connection operations of the SIP terminals 3A, 3B through the connection section 25 of the processing unit 2. In the embodiment described above, the control apparatus 4 checks the log-in state of the SIP terminal 3B to the IP network 1 and stores "10:30" of "log-in time", "11:10" of "log-out time" and "10:40" of "communication termination time" into the database section 43. The reason why "log-out time" is "11:10" results from the fact that after the termination of communication, the registry section 23 of the processing unit 2 monitors the call connection of the SIP terminal 3B and finds no re-log-in even after an elapse of 30 minutes, so that the SIP terminal 3B is logged off. Then, the management and control section 42 monitors the operation of the call connection of the SIP terminal 3B after logging-on and counts an elapse of the time on the basis of the result from the collating with the internal timer (not shown).

Although it becomes 14:40 after an elapse of a prescribed time (for example, 4 hours) from the termination of the communication under the transfer function, if the SIP terminal 3B is still in the state of log-out, the internal timer times out (Yes, in step s5). In this case, the control apparatus 4 determines that the user "U1" is not present at the conference room with the SIP terminal 3B installed therein and the SIP terminal 3B can not receives the incoming call through the transfer function. Therefore, the control apparatus 4 deletes the data related to the transfer function to release the transfer function and updates contents in the database section 43 (step s6).

The reference for time out of the internal timer may be set to the communication termination time at the transfer destination, or alternatively, it may be set to log-out time (here, "11:10") of the SIP terminal 3B with the transfer destination set therein. Or, it is acceptable to count an elapse time by using the time (here, "09:50" of "function setting time") when the transfer setting has been stored into the database section 43 as the reference. Moreover, it is acceptable to set the transfer function by using the date (not shown) when the setting of the transfer function is stored into the database section 43 and release the transfer function at the time when the date is changed.

A variety of conditions (elapsed time, time, date, etc.) of the time out of the internal timer are preset from the management terminal 6, etc. to the control apparatus 4. In addition to the management terminal 6, the SIP terminals 3 can set release conditions (elapsed time, time, etc.). For example, there is a command to set arbitrary release time with units of one hour by pressing each key button as "*, #, 1, *" by turns. Moreover there is a command to release the setting of the transfer function when the date is changed from the previously set date by inputting as "*, #, #, *" by turns.

According to the procedures mentioned above, it is possible to deal with forgetfulness of the release of the transfer function. In addition to this, an optional procedure shown as a step s5-1 in a flow chart in FIG. 7 may be provided. Hereinafter, a typical example of the optional procedure will be explained. With the procedure, even except for any one of the SIP terminals 3 assigned to a user can set and release the transfer function, a personality of the user can be secured. Since the transfer setting is automatically released by accessing to the SIP terminals 3, the forgetfulness of release can be prevented.

(1) <In the Case that a User "U1" Logs on from any One of the SIP Terminals 3 which does not Have the Telephone Number of a Transfer Destination>

In this case, the user "U1" logs on from the SIP terminal 3N with a telephone number "4567", or the user "U1" logs on from the SIP terminal 3A with a telephone number "1234" at its own desk. The management and control section 42 monitors the call connections of each SIP terminal 3 via the IP network 1 in a similar manner of the registry section 23 of the processing unit 2. Then, the control section 42 receives the calling signal transmitted from the SIP terminal 3A or 3N, and reads the user ID by collating it with the database section 43. If the read out user ID is "U1", the control section 42 recognizes that no body is present near by the SIP terminal 3B at the transfer destination of the user "U1" stored in the database section 43. Accordingly, the management and control section 42 determines that it is no use to transfer an incoming call to make communication, then, releases the transfer function for the incoming call directed to the SIP terminal 3A to the SIP terminal 3B (telephone number "2345").

(2)<In the Case that a New Transfer Destination is Set from the SIP Terminals 3 Except for the SIP Terminal 3A at Own Desk>

This is the case, for example, that the SIP terminal 3N sets a new transfer destination such as "4567" as a telephone number of a transfer destination, or the case that the SIP terminal 3N sets the telephone number "1234" of the SIP terminal 3A being an origin of transfer as a condition of transfer release.

The keyboard of the SIP terminal 3N sets a telephone number such as "*1234#4567*" or "*1234#1234*". When receiving information about setting of this new transfer function, the control section 42 overwrites "4567" or "1234" onto a telephone number "2345" of the transfer destination stored in the database section 43 and releases the transfer setting to the SIP terminal 3B. (Even if the SIP-terminal 3A has conducted these operations, similar processing is conducted).

In this embodiment, it is possible to secure mobility of a virtual terminal not applying only to personal mobility. Operations described above are processing procedures for the case in which the call connection to the user "U1" of the SIP terminal 3A is transferred. In place of these operations, it is possible to set in a manner that all of the telephone calls (callings) achieved the SIP terminal 3A without specifying the user of the SIP terminals 3 are transferred to other SIP terminals 3. That is, in the example described above, in the case that the SIP terminal 3A sets the transfer function, it is set by default that the transfer should indicate the call directed to the user "U1" if the transfer destination is set to "*2345". Accordingly, all of the callings directed to the SIP terminal 3A are transferred to the SIP terminal 3B by instructing a transfer command "*0*2345" with the information (for example *0) to release this specification of the user "U1" added thereto. The calling with the transfer function in the case of no specification of this user ID is notified to an application controlling unit 4 by a control packet including a destination IP address "Uo@192.168.200.5" and an IP address of the origin of transfer "U1@192.168.100.1".

Accordingly, the controlling unit 4 can recognize that the transferred call is a request for the transfer setting from the SIP terminal 3A by collating the IP address "U1@192.168.100.1" read from the packet with the stored data in the database section 43. The controlling init 4 monitors the call connection processing of the SIP terminal 3B and releases the corresponding transfer setting if there is no incoming call from the SIP terminal 3A (through transfer function) even after an elapse of a prescribed time after completion of the setting or after termination of communication though the transfer function.

In the command for the transfer function, the user ID of the corresponding SIP terminal 3 is not set by default. In contrast, the user ID may be input as "*U1*2345", etc. by setting the user ID of the SIP terminal 3 by default.

(Second Embodiment)

Figure 8:
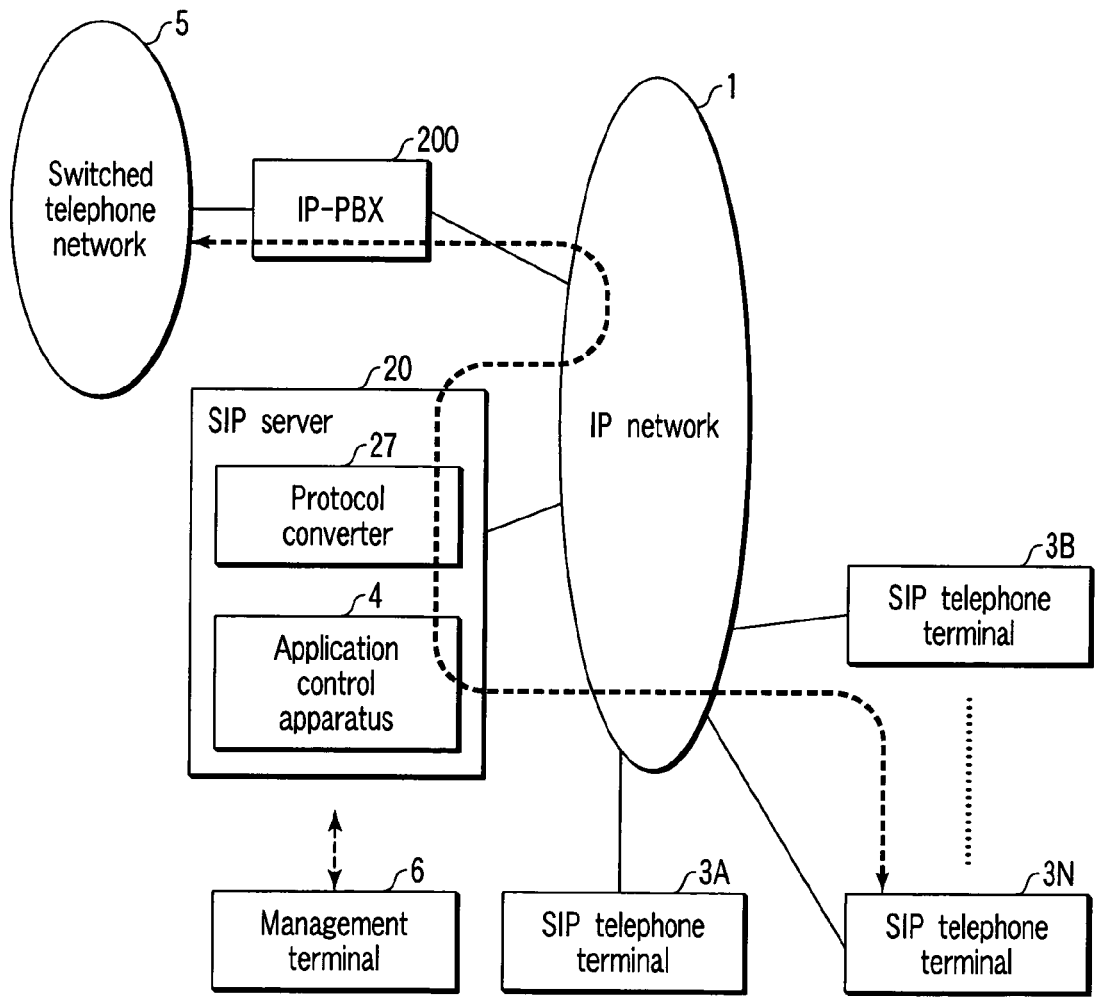
FIG. 8 is a system diagram showing a second embodiment of an SIP telephone system regarding the invention.

FIG. 8 is a system diagram showing a second embodiment of an SIP telephone system regarding the invention. The SIP telephone system in FIG. 8 comprises an IP network 1, an IP-PBX 200, an SIP server 20, SIP telephone terminals 3A-3N, a switched telephone network 5 and a management terminal 6.

The telephone network 5 is connected to the IP-PBX 200 for conducting call connection processing of an IP telephone. The IP-PBX 200 is connected to the SIP server 20 via the IP network 1. The IP-PBX 200 conducts a variety of kinds of processing without being limited to the call connection processing in SIP procedures.

The SIP server 20 is equivalent to an apparatus incorporating a function of an application control apparatus 4 with a call processing unit 2. The SIP server 20 treats the call connection of the IP telephone in the SIP procedures in one domain managed by the IP-PBX 200. If the protocol of the IP telephone in the IP-PBX 200 is different from the SIP procedures, the SIP server 20 or the IP-PBX 200 conducts protocol conversion processing. In FIG. 8, the SIP server 20 equips a protocol converter 27.

Figure 9:
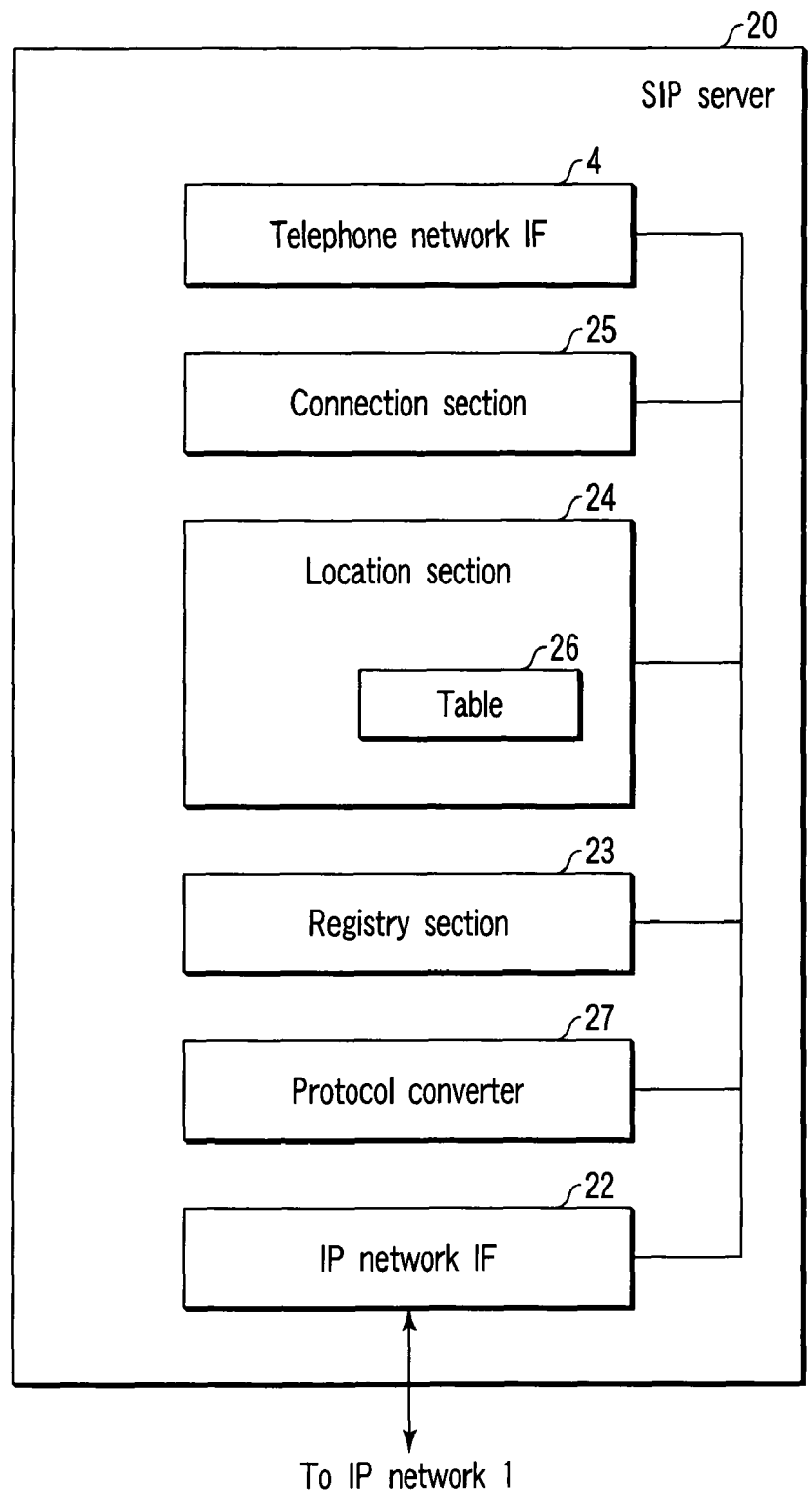
FIG. 9 is a functional block diagram showing the SIP server 20.

FIG. 9 is a functional block diagram showing the SIP server 20. The SIP server 20 incorporates functions of the protocol converter 27 and the control apparatus 4 with the call connection processing unit 2 in FIG. 1. In such a configuration described above, the operations and the processing procedures among the SIP terminals 3A-3N and the SIP server 20 are the same those of in the first embodiment. However, the control apparatus 4 of the server 20 controls the telephone function such as transfer.

(Third Embodiment)

Figure 10:
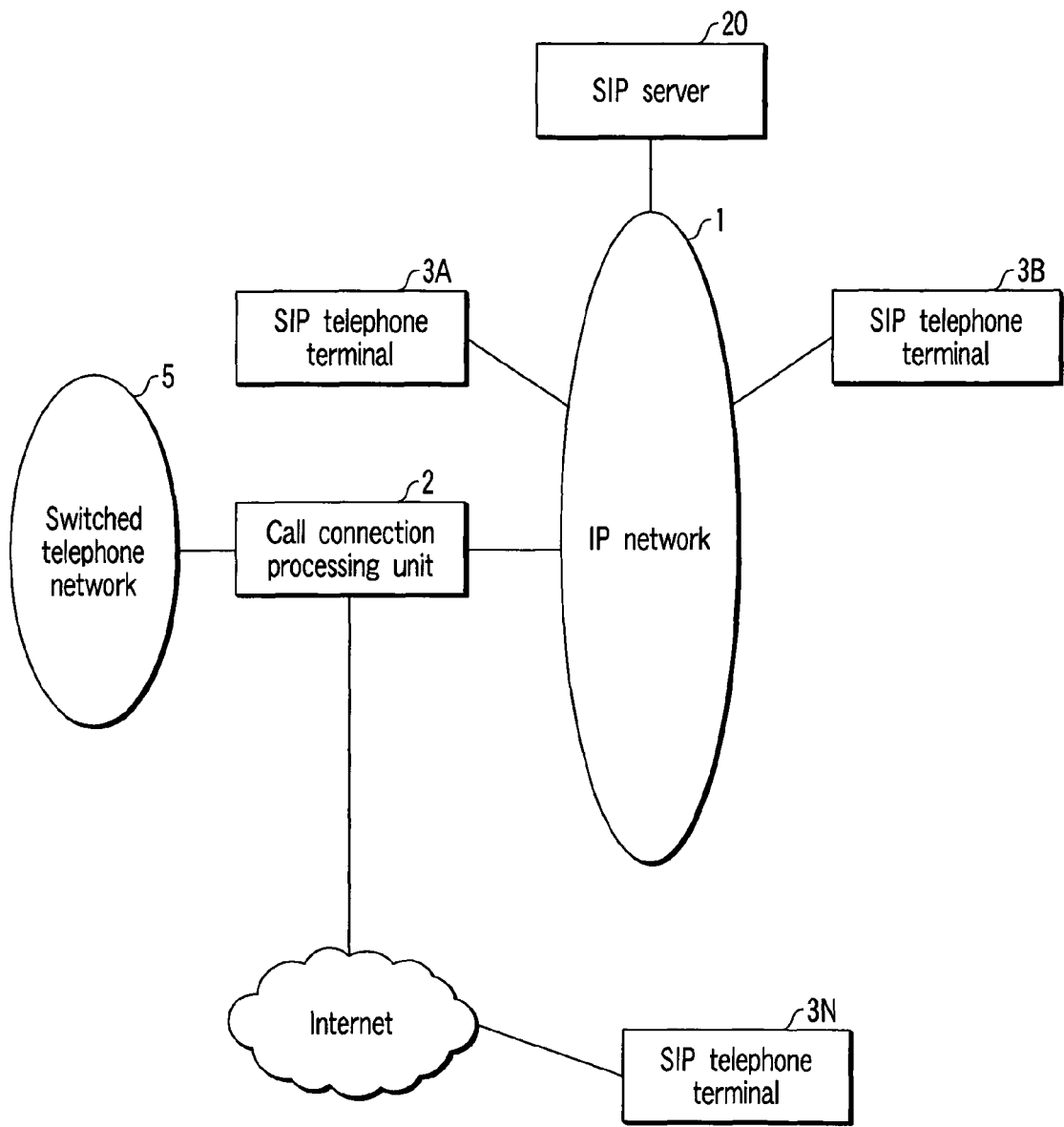
FIG. 10 is a system diagram showing a third embodiment of the SIP telephone system regarding the invention.

FIG. 10 is a system diagram showing a third embodiment of the SIP telephone system regarding the invention. In FIG. 10, a call connection processing unit 2 is connected to the Internet, and an SIP telephone terminal 3N is connected to the Internet. An SIP server 20 is connected to an IP network 1. As shown in FIG. 10, the invention can be applied even to a system in which SIP terminals 3A-3N belonging to the same group are connected to different communication networks. The system shown in FIG. 10 is assumed as a cease in which, for example, the SIP terminals 3A, 3B are disposed in the same office and the SIP terminal 3N is disposed in home of its operator.

FIG. 11 is a flowchart showing log-in procedures in the SIP telephone terminals 3A-3N in the third embodiment. In FIG. 11, for example, when a login button is pushed down or a log-in code is input in the SIP terminal 3N (step S21), The SIP terminal 3N enters into a waiting state for an input operation of a user ID and a password by a log-in user (step S22). When the user ID and the password are input, the SIP terminal 3N transmits the user ID and the password to the SIP server 20 (step S23).

When the SIP server 20 receives the user ID and the password from the SIP terminal 3N (step S25), it performs authentication processing immediately (step S26). In the authentication processing, the validity of the user ID and the password is checked in with reference to a database prepared in advance. (step S27). When the authentication is approved resulting from the checking, the ID of the log-in user and the ID of the SIP terminal 3N are associated with each other, and they are registered in the databases shown in FIG. 5A-(C) (step S28). The resulting authentication is notified to the SIP terminal 3N and it receives the notification (step S24).

Figure 12:
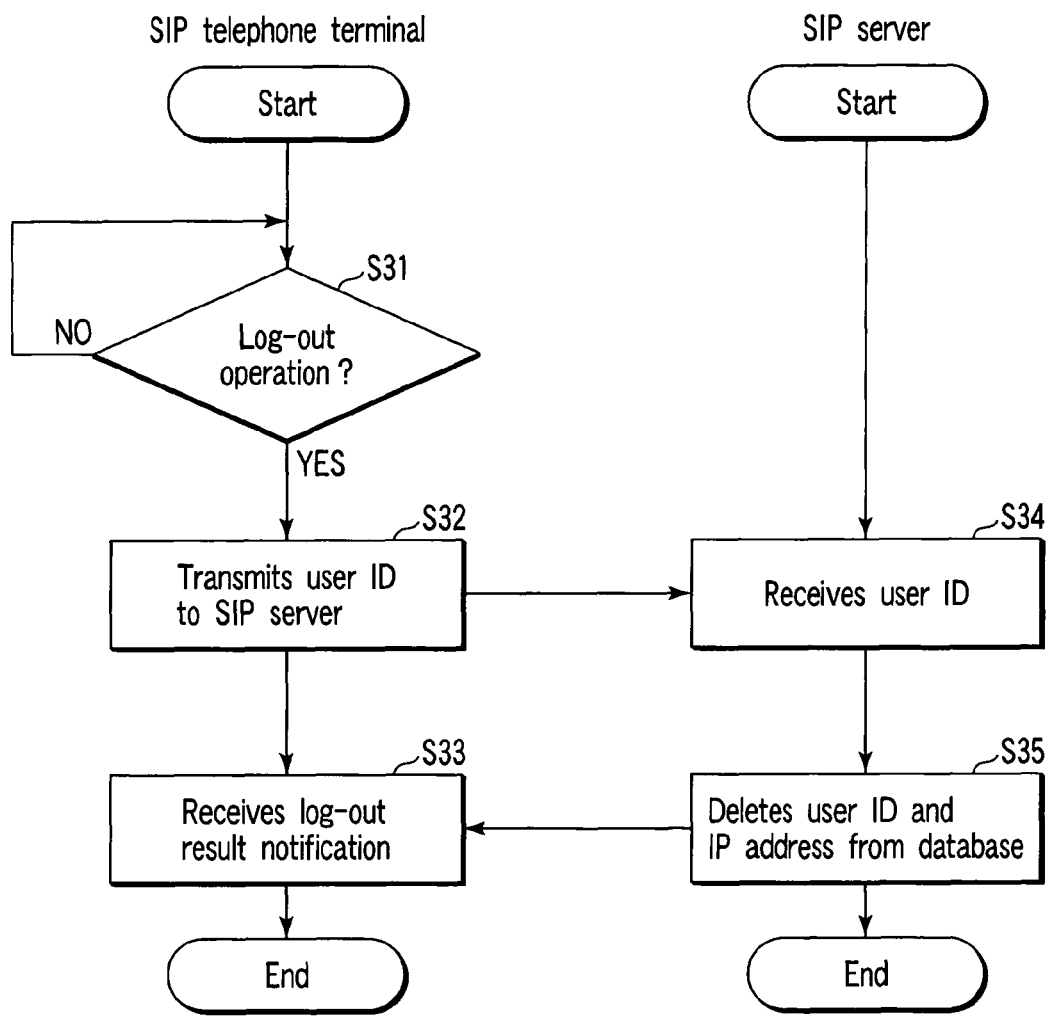
FIG. 12 is a flowchart showing log-out procedures in the SIP telephone terminals in the third embodiment.

FIG. 12 is a flowchart showing log-out procedures in the SIP telephone terminals in the third embodiment. In FIG. 12, it is assumed that, for example, a user Un during log-in into the SIP terminal 3N performs a log-out operation (step S31). Then, the SIP terminal 3N transmits the user ID of the user Un to the SIP server 20 (step S32). When the SIP server 20 receives the user ID (step S34), it deletes the ID and the password of the user Un from the databases shown in FIG. 5A-(C) (step S35). The result of the log-out processing is notified to the SIP terminal 3N, and it receives the notification (step S33).

According to the procedures described above, Each SIP terminal 3A-3N performs log-in/log-out processing of the user. This processing relates to an optional procedure shown in the flowchart in FIG. 7 (step s5-1). That is, the SIP server 20 monitors the log-in/log-out statuses of the user at every SIP terminal 3A-3N. Then, when the log-in user logs in an SIP terminal differing from the SIP which has been set as a transfer destination, the SIP server 20 forcibly releases setting of a transfer function. Referring now to FIG. 5C, the SIP terminal 3A has the transfer function to make the SIP terminal 3B be a transfer destination. It is assumed that a user U1 relating to these SIP terminals has logged in. Then, the transfer function which has been set to the SIP terminal 3A is released, after this, the incoming call to the user U1 is not transferred to the SIP terminal 3B. Accordingly, since the transfer function is automatically released with the log-in operation as a trigger, even if the user U1 forgets to release the transfer setting, the state is not left as it is.

(Fourth Embodiment)

Figure 13:
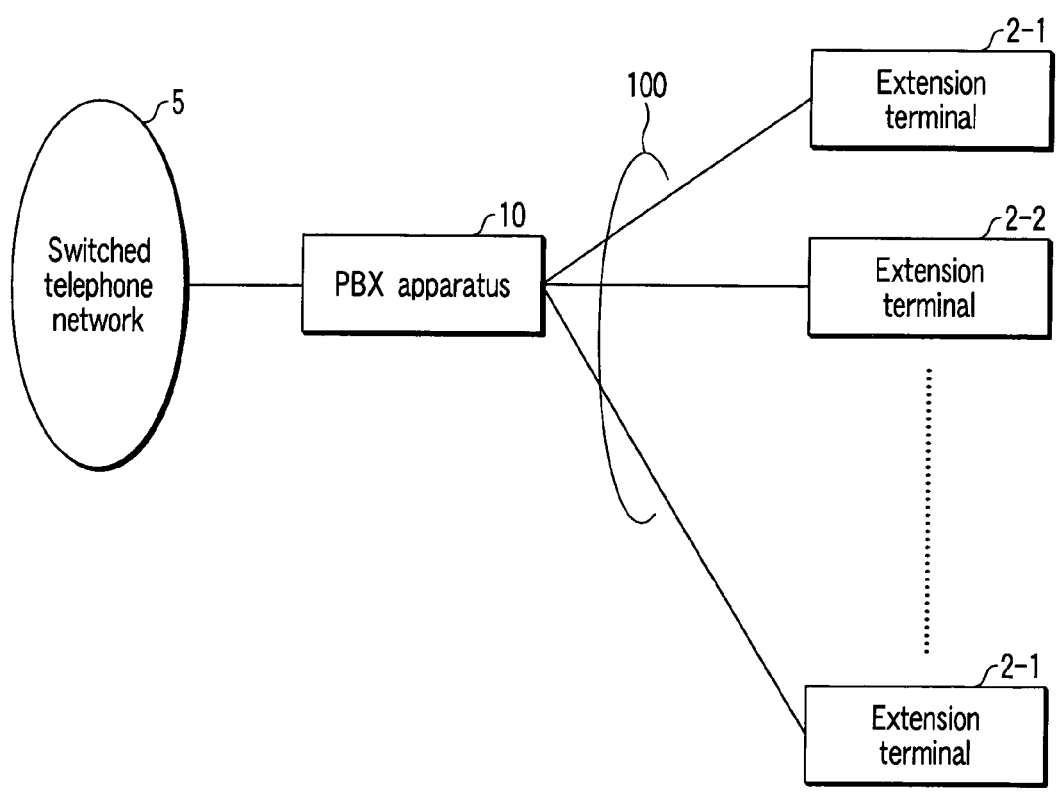
FIG. 13 is a system diagram showing a fourth embodiment of a telephone system regarding the invention.

FIG. 13 is a system diagram showing a fourth embodiment of a telephone system regarding the invention. The telephone system in FIG. 13 has extension terminals 2-1 to 2-$i$ and a private branch exchange (PBX) apparatus 10 connected to the terminals 2-1 to 2-$i$ via an extension network 100. The PBX apparatus 10 is connected to a switched telephone network 5. This telephone system is a private extension telephone network formed by connecting the PBX apparatus 10 to the terminals 2-1 to 2-$i$ and does not have an SIP server. Therefore, the PBX apparatus 10 integrally controls a function with respect to setting and releasing of a transfer function.

FIG. 14 is a block diagram showing the PBX apparatus 10 in FIG. 13. The PBX apparatus 10 has a time switch 11, trunk line interface circuits 12-1 to 12-$j$, extension interface circuits 13-1 to 13-$i$, a control unit 14, a storage unit 15 and a data highway interface unit 16. The time switch 11, the trunk line interface circuits 12-1 to 12-$j$ and the extension interface circuits 13-1 to 13-$i$ are connected with one another via a PCM highway 18.

The trunk interface circuits 12-1 to 12-$j$, the extension interface circuits 13-1 to 13-$i$ and the data highway interface unit 16 are connected with one another via a data highway 19. Furthermore, the control unit 14, the storage unit 15 and the data highway interface unit 16 are connected one another via a CPU bus 17. The time switch 11 is directly connected to the control unit 14.

The time switch 11 applies exchange-connection between the trunk line circuits 12-1 to 12-$j$ and extension interface circuits 13-1 to 13-$i$ by exchanging time slots on the PCM highway 18 on the basis of the control by the control unit 14.

The trunk interface circuits 12-1 to 12-$j$ are connected to trunk lines L-1 to L-j, respectively, such as public lines and dedicated lines. Each trunk line interface circuit 12-1 to 12-$j$ performs trunk line interface operations with regard to the connected trunk lines L-1 to L-j. The trunk line interface operations perform conversion from audio signals (analog) applied though trunk lines L into PCM signals, conversion from PCM signals applied through the time switch 11 into audio signals (analog), monitoring of states of the trunk lines L, transmission of a variety of signals to networks connected through the trunk lines L, and the like. Each trunk line interface circuit 12-1 to 12-$j$ transmits and receives a variety of items of control information to and from the control unit 14 though the data highway interface unit 16, the data highway 19 and the CPU bus 17.

The extension interface circuits 13-1 to 13-$i$ connect to the external terminals 2-1 to 2-$j$, respectively, if necessary. The extension interface circuits 13-1 to 13-I perform extension interface processing with respect to connected extension terminals 2-1 to 2-$i$. The extension interface processing performs extraction PCM signals output from the extension terminals 2-1 to 2-$i$ from the PCM highway 18, monitoring of states of the extension terminals 2-1 to 2-$i$, transmission of a variety of signals to the extension terminals 2-1 to 2-$i$ and the like. The extension interface circuits 13-1 to 13-$i$ transmit and receive a variety of items of control information related to the extension interface processing to and from the control unit 14 through the data highway 19, the data highway interface unit 16 and the CPU bus 17.

The control unit 14 achieves operations as the PBX apparatus 100 by the processing based on an operation program stored into the storage unit 15. The storage unit 15 stores the operation program of the control unit 14 and other variety of pieces of data. In the fourth embodiment, the control unit 14 has control functions with respect to setting and releasing of transfer.

Figure 15:
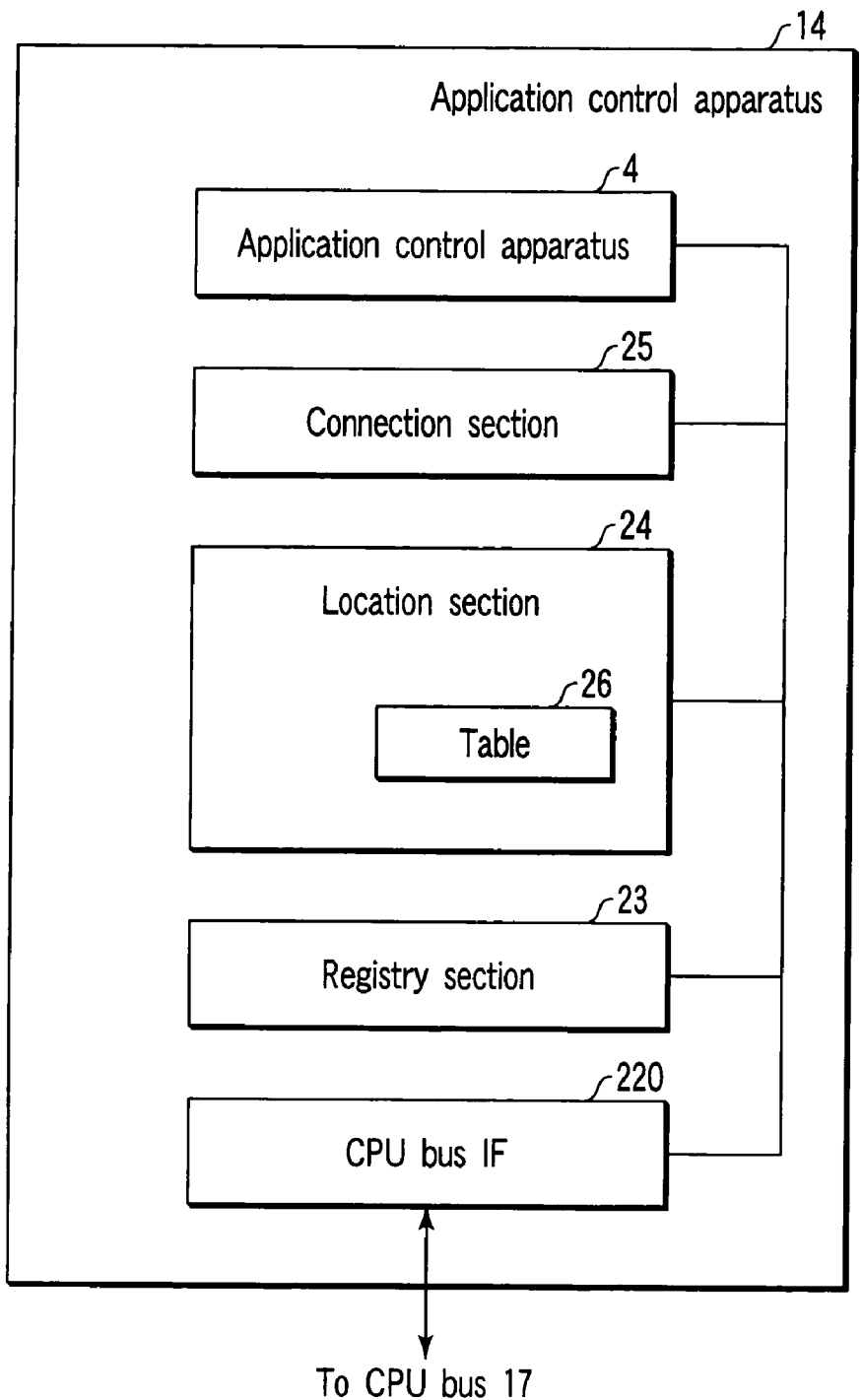
FIG. 15 is a functional block diagram showing the control unit 14 of the PBX apparatus 10 shown in FIG. 14.

FIG. 15 is a functional block diagram showing the control unit 14 of the PBX apparatus 10 shown in FIG. 14. In the fourth embodiment as mentioned above, the PBX apparatus 10 builds in the control function for the SIP server 20 shown in FIG. 9. That is, the control unit 14 builds in the function of the application control apparatus 4, a connection unit 25, a location unit 24 and a registrar unit 23 shown in FIG. 9. Each unit is connected to the CPU bus 17 through a CPU bus interface 220. In this configuration, the control unit 14 integrally performs log-in/log-out processing to the extension terminals 2-1 to 2-$i$ and registration/deletion of information to/from a table 26. Processing procedures with regard to log-in/log-out processing are similar to those of FIG. 11, FIG. 12 and control with respect to management for the table 26 is similar to that of FIG. 7.

As described above, in the forth embodiment, the telephone system can manage the log-in/log-out of the private extension telephone system without having to use an SIP protocol and set/release the transfer function, based on the state of the log-in/log-out. Such as the invention can be applied even to the private extension telephone system.

What is claimed is:

1. A SIP telephone system to secure user's personal mobility, the system comprising a plurality of SIP telephone terminals, a switching device connected to the SIP telephone terminals via a communication network, and a SIP server connected to the communication network, wherein the SIP telephone system manages a log-in/log-out state at the plurality of SIP telephone terminals, and wherein:

the switching device comprises a transfer section for transferring an incoming call with a destination of a first SIP telephone terminal, on which a user has logged in and in which a transfer function is set, to a second SIP telephone terminal at a transfer destination, and the SIP server comprises:
an internal timer for counting time; and
a releasing section, wherein:
the releasing section releases the setting of the transfer function when the internal timer counts a first predetermined time after completion of the setting of the transfer function;
the releasing section releases the setting of the transfer function when the internal timer counts a second predetermined time after termination of the incoming call at the second SIP telephone terminal;
the releasing section releases the setting of the transfer function when the user logs in a second time on the first SIP telephone terminal or logs in on a third SIP telephone terminal other than the first and second SIP telephone terminals; and
the releasing section releases the setting of the transfer function when a new transfer destination is set at a fourth SIP telephone terminal other than the first and second SIP telephone terminals, the new transfer destination being a destination other than the second and fourth SIP telephone terminals.

2. The telephone system according to claim 1, wherein the releasing section releases the transfer function setting and deletes transfer destination data after the second predetermined time.

3. The telephone system according to claim 2, wherein the releasing section releases the transfer function setting and deletes the transfer destination data on the day after the transfer function is set.

4. The telephone system according to claim 1, wherein the second predetermined time is variably set by a command input by the plurality of SIP telephone terminals.

5. The telephone system according to claim 1, wherein the communication network is a local network.

6. The telephone system according to claim 1, wherein the communication network is a wide area network including a general purpose network.

7. The telephone system according to claim 1, wherein the communication network is an IP network.

8. The telephone system according to claim 1, wherein the transfer section receives setting contents of the transfer function from the first SIP telephone terminal, after the transfer function is set in the first SIP telephone terminal.

9. A SIP telephone system to secure user's personal mobility, the system comprising a plurality of SIP telephone terminals, and a switching device connected to the SIP telephone terminals via a communication network, wherein the SIP telephone system manages a log-in/log-out state at the plurality of SIP telephone terminals, and wherein the switching device comprises:

a transfer section for transferring an incoming call with a destination of a first SIP telephone terminal, with a user logged in and a transfer function set, to a second SIP telephone terminal at a transfer destination;

an internal timer for counting time; and a releasing section, wherein:

the releasing section releases the setting of the transfer function when the internal timer counts a first predetermined time after completion of the setting of the transfer function;

the releasing section releases the setting of the transfer function when the internal timer counts a second predetermined time after termination of the incoming call at the second SIP telephone terminal;

the releasing section releases the setting of the transfer function when the user logs in a second time on the first SIP telephone terminal or logs in on a third SIP telephone terminal other than the first and second SIP telephone terminals; and the releasing section releases the setting of the transfer function when a new transfer destination is set at a fourth SIP telephone terminal other than the first and second SIP telephone terminals, the new transfer destination being a destination other than the second and fourth SIP telephone terminals.

10. The telephone system according to claim 9, wherein the releasing section releases the transfer function setting and deletes transfer destination data after the second predetermined time.

11. The telephone system according to claim 10, wherein the releasing section releases the transfer function setting and deletes the transfer destination data on the day after the transfer function is set.

12. The telephone system according to claim 9, wherein the second predetermined time is variably set by a command input by the plurality of SIP telephone terminals.

13. The telephone system according to claim 9, wherein the communication network is a local network.

14. The telephone system according to claim 9, wherein the communication network is a wide area network including a general purpose network.

15. The telephone system according to claim 9, wherein the communication network is an IP network.

16. The telephone system according to claim 9, wherein the transfer section receives setting contents of the transfer function from the first SIP telephone terminal, after the transfer function is set in the first SIP telephone terminal.

* * * * *